(12) United States Patent
Johnson

(10) Patent No.: US 8,029,401 B2
(45) Date of Patent: Oct. 4, 2011

(54) SPLIT PATH POWER SHIFT TRANSMISSION

(75) Inventor: Douglas Rene Johnson, Waterloo, IA (US)

(73) Assignee: Deere & Company, Moline, IL (US)

( * ) Notice: Subject to any disclaimer, the term of this patent is extended or adjusted under 35 U.S.C. 154(b) by 525 days.

(21) Appl. No.: 12/262,438

(22) Filed: Oct. 31, 2008

(65) Prior Publication Data

US 2010/0113209 A1 May 6, 2010

(51) Int. Cl.
*F16H 37/04* (2006.01)
(52) U.S. Cl. .................................. 475/218; 475/207
(58) Field of Classification Search .......... 475/207–209, 475/218
See application file for complete search history.

(56) References Cited

U.S. PATENT DOCUMENTS

| | | | | |
|---|---|---|---|---|
| 5,573,471 A | * | 11/1996 | Shubinsky et al. | 475/207 |
| 5,971,883 A | * | 10/1999 | Klemen | 475/296 |
| 6,733,412 B2 | * | 5/2004 | Kumagai et al. | 475/218 |
| 6,869,379 B2 | * | 3/2005 | Voss et al. | 475/218 |
| 7,798,937 B2 | * | 9/2010 | Gitt | 475/302 |
| 7,896,770 B2 | * | 3/2011 | Earhart et al. | 475/218 |
| 7,913,581 B2 | * | 3/2011 | Jackson | 74/330 |

\* cited by examiner

*Primary Examiner* — Ha D. Ho

(57) ABSTRACT

A transmission for a vehicle includes an input shaft, a carrier sun shaft, and an output shaft. A planetary gear set includes a sun gear coupled with the carrier sun shaft, a ring gear coupled with the output shaft, and a plurality of planetary gears enmeshed between the sun gear and the ring gear. A plurality of shift elements each include a first gear coupled with the input shaft, and a second gear coupled with the carrier sun shaft and enmeshed with the first gear. A plurality of shift clutches are each selectively coupled between a corresponding shift element and the input shaft or carrier sun shaft. A low range clutch is selectively coupled between the input shaft and the plurality of planetary gears. A high range clutch is selectively coupled between the carrier sun shaft and the output shaft. A reverse range clutch is selectively coupled between an immovable feature and the plurality of planetary gears.

22 Claims, 2 Drawing Sheets

SPLIT PATH POWER SHIFT TRANSMISSION

FIELD OF THE INVENTION

The present invention relates to work machines, and, more particularly, to transmissions used in such work machines.

BACKGROUND OF THE INVENTION

A work machine such as an agricultural tractor may include an internal combustion (IC) engine which provides input power to a transmission, which in turn is coupled with and drives the rear axles through a rear end differential. The transmission, rear end differential and rear axles are sometimes referred to as the "rear end" of the work machine. The transmission typically is attached to the front of and provides input power to the rear end differential. The rear end differential provides ground power to the two rear axles, and also usually includes at least one power take-off (PTO) shaft extending rearwardly within the three point hitch arrangement at the rear of the tractor.

With a work machine as described above, it is common to provide a transmission with multiple shift ranges. Typically one shift lever is used to shift between multiple gear ranges (e.g., A, B, C and D gear ranges), and a second shift lever is used to shift between discrete gear pairs within each range (e.g., 1, 2, 3 or 4). The assignee of the present invention also markets a "PowerShift" series transmission in which at least one shift lever need not be foot clutched to shift "on-the-fly" during use. Variants of the PowerShift transmission go back to the 4020 series tractors manufactured in the 1960's.

Many transmissions used with work machines as described above include multiple shift elements (two or more gear pairs) which are shifted to place the transmission in a selected gear range and gear. Shifting multiple shift elements can be complex and difficult.

What is needed in the art is a transmission which is easier and simpler to shift during operation.

SUMMARY OF THE INVENTION

The invention in one form is directed to a transmission for a vehicle, including an input shaft, a carrier sun shaft, and an output shaft. A planetary gear set includes a sun gear coupled with the carrier sun shaft, a ring gear coupled with the output shaft, and a plurality of planetary gears enmeshed between the sun gear and the ring gear. A plurality of shift elements each include a first gear coupled with the input shaft, and a second gear coupled with the carrier sun shaft and enmeshed with the first gear. A plurality of shift clutches are each selectively coupled between a corresponding shift element and the input shaft or carrier sun shaft. A low range clutch is selectively coupled between the input shaft and the plurality of planetary gears. A high range clutch is selectively coupled between the carrier sun shaft and the output shaft. A reverse range clutch is selectively coupled between an immovable feature and the plurality of planetary gears.

The invention in another form is directed to a transmission for use in a work machine, including a power input shaft, a carrier sun shaft, and a power output shaft. A plurality of shift elements each include a first gear carried by the input shaft, a second gear carried by the carrier sun shaft and enmeshed with the first gear, and a shift clutch selectively coupling the first gear or second gear with the input shaft or carrier sun shaft, respectively. A planetary gear set includes a sun gear mounted to the carrier sun shaft, at least one planetary gear engaged with and positioned radially outside of the sun gear, and a ring gear positioned radially outside of the at least one planetary gear. The ring gear interconnects the at least one planetary gear with the output shaft. A low range clutch selectively interconnects the input shaft with the at least one planetary gear. A high range clutch selectively and directly interconnects the carrier sun shaft with the output shaft.

The invention in yet another form is directed to a work machine including an engine and a rear end coupled with the engine. The rear end includes a transmission having an input shaft, a carrier sun shaft, and an output shaft. A planetary gear set includes a sun gear coupled with the carrier sun shaft, a ring gear coupled with the output shaft, and a plurality of planetary gears enmeshed between the sun gear and the ring gear. A plurality of shift elements each include a first gear coupled with the input shaft, and a second gear coupled with the carrier sun shaft and enmeshed with the first gear. A plurality of shift clutches are each selectively coupled between a corresponding shift element and the input shaft or carrier sun shaft. A low range clutch is selectively coupled between the input shaft and the plurality of planetary gears. A high range clutch is selectively coupled between the carrier sun shaft and the output shaft. A reverse range clutch is selectively coupled between an immovable feature and the plurality of planetary gears.

The invention in all the above forms has only single elements shifts from one gear to the next. In the first five gears, only the input clutches are changing, between gear 5 and 6 only the output clutches are changing, and in the higher fives gears only the input clutches are changing. This can be summarized in the following table, which is given only as an example.

|      | Clutch | | | Ground speed |
| --- | --- | --- | --- | --- |
| Gear | Input | Output | Ratio | (kph) |
| 1 | C5 | Low | 0.10 | 2.1 |
| 2 | C4 | Low | 0.16 | 3.4 |
| 3 | C3 | Low | 0.28 | 6.2 |
| 4 | C2 | Low | 0.32 | 7.1 |
| 5 | C1 | Low | 0.37 | 8.1 |
| 6 | C1 | High | 0.47 | 10.3 |
| 7 | C2 | High | 0.67 | 14.7 |
| 8 | C3 | High | 0.83 | 18.2 |
| 9 | C4 | High | 1.34 | 29.5 |
| 10 | C5 | High | 1.59 | 34.9 |
| 1R | C1 | Reverse | −0.12 | −2.5 |
| 2R | C2 | Reverse | −0.16 | −3.6 |
| 3R | C3 | Reverse | −0.20 | −4.5 |
| 4R | C4 | Reverse | −0.33 | −7.2 |
| 5R | C5 | Reverse | −0.39 | −8.5 |

DETAILED DESCRIPTION OF THE INVENTION

Figure 1:
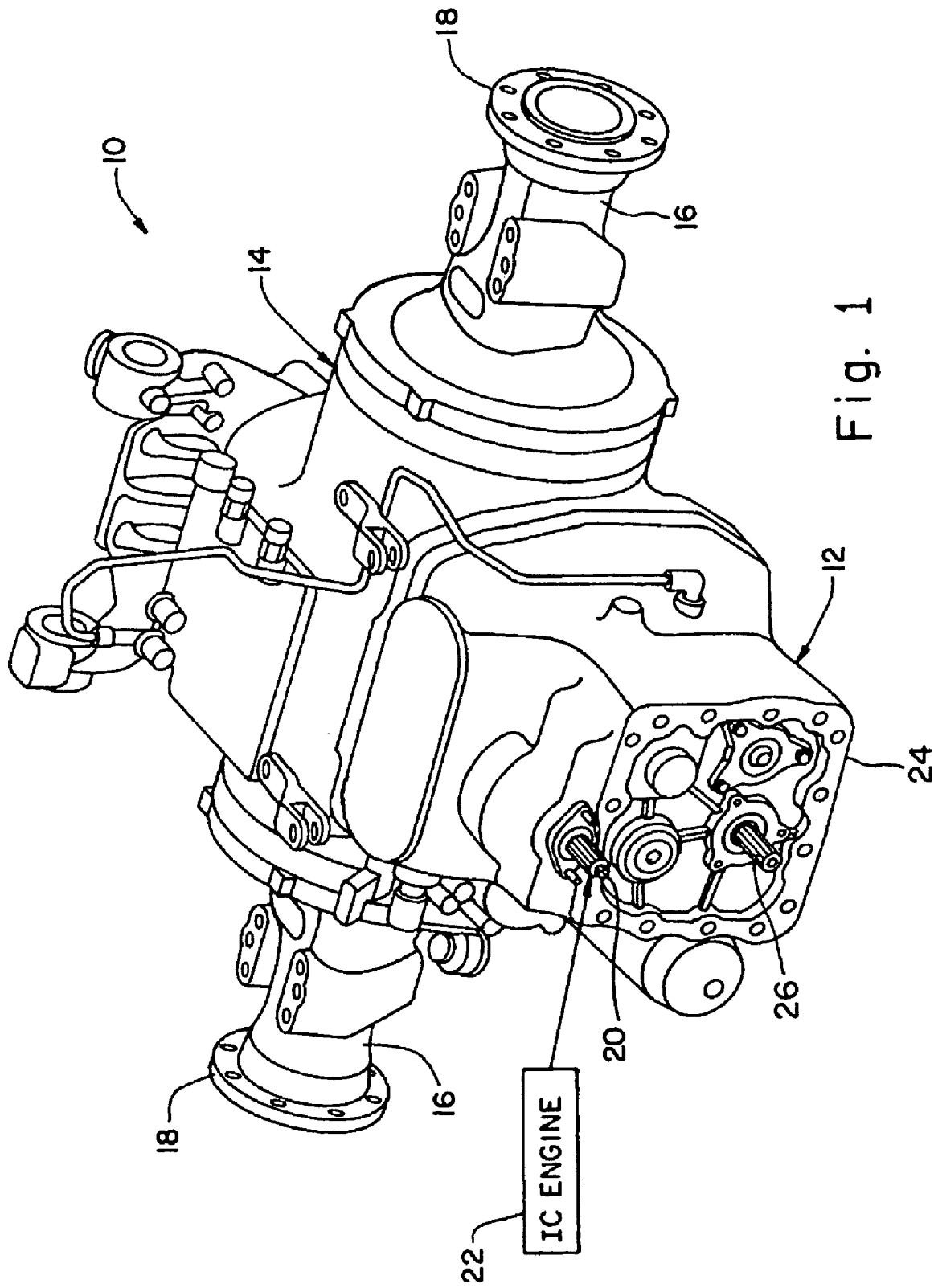
FIG. 1 is a perspective view of an embodiment of a rear end of the present invention used in a work machine in the form of an agricultural tractor.

Referring now to the drawings, and more particularly to FIG. 1, there is shown a portion of a vehicle or work machine 10 in the form of an agricultural tractor, particularly the rear end drive train of the tractor. Although shown as an agricultural tractor, it is possible that vehicle or work machine 10 could be in the form of a different type of vehicle or work machine, such as a construction tractor or forestry machine.

Tractor 10 includes a rear end with a transmission 12 which is coupled with a rear end differential 14, which in turn drives a pair of rear axles 16. Each rear axle 16 includes an outboard hub 18 to which a respective rear drive wheel (not shown) is mounted. Although rear axles 16 are shown configured for carrying respective drive wheels, it is also possible that rear end differential 14 can be configured for driving a pair of ground engaging tracks.

Transmission 12 includes a driven shaft 20 which is mechanically coupled with and receives rotational input power from IC engine 22, shown schematically in FIG. 1. Driven shaft 20 extends through and is rotatably carried by housing 24, which likewise houses and rotatably carries a number of other components. For example, housing 24 carries a mechanical front wheel drive (MFWD) module (not specifically shown) which selectively transfers output power to an output shaft 26 providing rotational output power to the MFWD at the front axle of tractor 10. A clutch arrangement (not shown) selectively interconnects with output shaft 26 so that the MFWD is engaged by actuation of a switch (not shown) in the operator's station.

Driven shaft 20 also transfers rotational power to a shifting arrangement 28 positioned within transmission housing 24. Shifting arrangement 28 transfers the rotational power, according to a selected gear ratio, to rear end differential 14 (see FIG. 2).

According to an aspect of the present invention, shifting arrangement 28 generally includes an input shaft 30, a carrier sun shaft 32, an output shaft 34, a planetary gear set 36, a plurality of shift elements 38, a plurality of shift clutches 40, a low range clutch 42, a high range clutch 44, and a reverse range clutch 46.

Input shaft 30 of shifting arrangement 28 receives rotational input power either directly or indirectly from driven shaft 20, which is the power input to transmission 12. Input shaft 30 has an output end which is coupled either directly or indirectly with a PTO drive, as indicated.

Carrier sun shaft 32 has a longitudinal axis which is arranged generally parallel to the longitudinal axis of input shaft 30. Carrier sun shaft 32 and input shaft 30 together carry a number of shift elements 38 which are arranged sequentially adjacent to each other along a length of input shaft 30 and carrier sun shaft 32. Each shift element 38 generally corresponds to an operator selected gear, and includes a first gear 48 coupled with input shaft 30, and a second gear 50 coupled with carrier sun shaft 32. Shifting arrangement 28 is shown as including five discrete shift elements 38. When viewed from left to right, it is apparent that each first gear 48 becomes smaller in diameter, with the fastest shift element 38 being on the left side and the slowest shift element 38 being on the right side. Conversely, when viewed from left to right, each shift element 38 has a second gear 50 carried by carrier sun shaft 32 which becomes increasingly larger corresponding to the same shift elements. (The gears do not necessarily have to be ordered from largest to smallest)

Each shift element 38 also has a shift clutch 40 associated therewith. The shift clutch 40 selectively couples a gear on the input shaft 20 to the corresponding gear on the carrier sun shaft. Each shift clutch 40 is preferably electronically engaged, such as through a transmission control unit (TCU). Since each shift clutch 40 takes additional axial space along the length of the corresponding input shaft 30 or carrier sun shaft 32, shifting arrangement 28 shown in FIG. 2 includes a plurality of shift clutches 40 which alternate between adjacent shift elements 38 for selective interconnection with either input shaft 30 or carrier sun shaft 32. This reduces the axial spread of shifting elements 38 along the length of input shaft 30 and carrier sun shaft 32. It is to be understood, however, that shift clutches 40 need not necessarily alternate for selective connection with input shaft 30 or carrier sun shaft 32, and could possibly all be configured to couple with input shaft 30 or carrier sun shaft 32.

Planetary gear set 36 includes a sun gear 52 which is coupled with carrier sun shaft 32. One or more planetary gears 54 are engaged with and positioned radially outside of sun gear 52. A ring gear 56 is positioned radially outside of the one or more planetary gears 54. Ring gear 56 is rigidly coupled with an end of output shaft 34, thereby interconnecting the one or more planetary gears 54 with output shaft 34.

Figure 2:
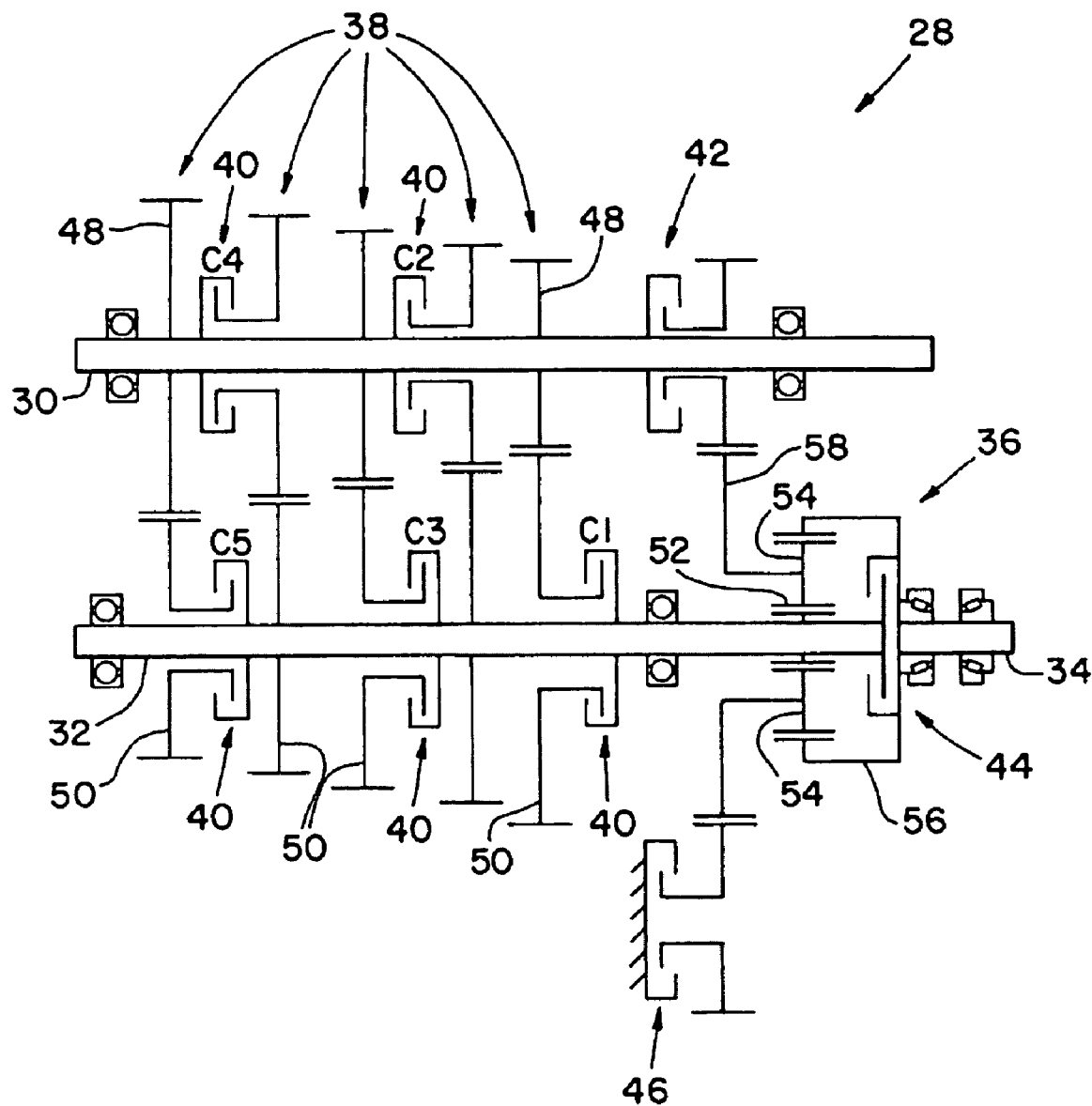
FIG. 2 is a schematic illustration of an embodiment of a shifting arrangement of the present invention used in the transmission shown in FIG. 1.

In the embodiment shown in FIG. 2, planetary gear set 36 includes a plurality of planetary gears 54 which are enmeshed between sun gear 52 and ring gear 56. The plurality of planetary gears 54 are mounted in a planetary carrier. The carrier gear 58 is also coupled to the planetary carrier and rotates at the same speed as the planetary carrier. Carrier gear 58 has outboard teeth which enmesh with the gear of the low range clutch 42 and the gear of the reverse range clutch 46, as will be described in more detail below.

High range clutch 44 is configured to lock the planetary action of planetary gear set 36, and concurrently directly couple an end of carrier sun shaft 32 with an adjacent end of the coaxially arranged output shaft 34. Other ways of locking the planetary carrier for direct drive are also possible.

Reverse range clutch 46 is selectively coupled between an immovable feature and the plurality of planetary gears 54 by a carrier gear 58. For example, reverse range clutch 46 can be coupled with an immovable feature such as housing 24 of transmission 12.

During operation, if an operator selects one of the five lower gears, low range clutch 42 is engaged and power flows directly from input shaft 30 to the combining planetary gear set 36 through carrier gear 58. Power also flows from input shaft 30 through a selected shift clutch 40 marked C1-C5 to carrier sun shaft 32, and sun gear 52 carried thereby. The output to output shaft 34 is effected through ring gear 56 when low range clutch 42 is engaged.

In the upper five gears, the combining planetary gear set 36 is locked by engaging high range clutch 44 so that there is no planetary action. Input shaft 30 is coupled to output shaft 34 through one of the shift clutches 40 marked C1-C5.

In reverse, reverse range clutch 46 is engaged and rotation of carrier gear 58 is stopped, which reverses the rotational direction of ring gear 56 coupled with output shaft 34. The particular reverse speed is selected using one of the shift clutches 40 marked C1-C5.

From the foregoing description of operation, it is apparent that only two clutches at any given time are engaged, one shift clutch 40 marked C1-C5, and either the low range clutch 42, high range clutch 44 or reverse range clutch 46. This results in an effective and yet more simple shifting arrangement for transmission 12.

Although the description of mechanical components and method of operation for shifting arrangement 28 are described above with respect to a ten-speed transmission, it will also be apparent that the same inventive concepts can be applied to other transmissions, such as an eight-speed transmission, etc.

Having described the preferred embodiment, it will become apparent that various modifications can be made without departing from the scope of the invention as defined in the accompanying claims.

The invention claimed is:

1. A transmission for a vehicle, comprising:
 an input shaft;
 a carrier sun shaft;
 an output shaft;
 a planetary gear set including a sun gear coupled with said carrier sun shaft, a ring gear coupled with said output shaft, and a plurality of planetary gears enmeshed between said sun gear and said ring gear;
 a plurality of shift elements, each said shift element including a first gear coupled with said input shaft, and a second gear coupled with said carrier sun shaft and enmeshed with said first gear;
 a plurality of shift clutches, each said shift clutch selectively coupled between a corresponding said shift element and one of said input shaft and said carrier sun shaft;
 a low range clutch selectively coupled between said input shaft and said plurality of planetary gears;
 a high range clutch selectively coupled between said carrier sun shaft and said output shaft; and
 a reverse range clutch selectively coupled between an immovable feature and said plurality of planetary gears.

2. The transmission of claim 1, including a carrier gear coupled between said plurality of planetary gears, and each of said low range clutch and said reverse range clutch.

3. The transmission of claim 1, wherein said high range clutch is configured to lock planetary action of said planetary gear set when engaged.

4. The transmission of claim 1, wherein said plurality of shift clutches alternate between adjacent said shift elements for a selective interconnection with one of said input shaft and said carrier sun shaft.

5. The transmission of claim 1, wherein said output shaft is generally coaxially aligned with said carrier sun shaft.

6. The transmission of claim 1, wherein said plurality of shift elements are arranged sequentially adjacent to each other along a length of said input shaft and said carrier sun shaft, wherein said low range clutch and said reverse range clutch are arranged generally in line with each other along said length of said input shaft and said carrier sun shaft, and said planetary gear set is arranged at adjacent ends of said carrier sun shaft and said output shaft.

7. The transmission of claim 1, wherein said vehicle is a work machine.

8. A transmission for use in a work machine, said transmission comprising:
 a power input shaft;
 a carrier sun shaft;
 a power output shaft;
 a plurality of shift elements, each said shift element including a first gear carried by said input shaft, a second gear carried by said carrier sun shaft and enmeshed with said first gear, and a shift clutch selectively coupling one of said first gear and said second gear with one of said input shaft and said carrier sun shaft, respectively;
 a planetary gear set including a sun gear mounted to said carrier sun shaft, at least one planetary gear engaged with and positioned radially outside of said sun gear, and a ring gear positioned radially outside of said at least one planetary gear, said ring gear interconnecting said at least one planetary gear with said output shaft;
 a low range clutch selectively interconnecting said input shaft with said at least one planetary gear; and
 a high range clutch selectively and directly interconnecting said carrier sun shaft with said output shaft.

9. The transmission of claim 8, including a reverse clutch selectively coupled with and stopping rotation of said at least one planetary gear.

10. The transmission of claim 8, wherein each said shift element provides a different gear ratio to said output shaft.

11. The transmission of claim 8, including a carrier gear coupled between said at least one planetary gear and each of said low range clutch and said reverse range clutch.

12. The transmission of claim 8, wherein said high range clutch is configured to lock planetary action of said planetary gear set when engaged.

13. The transmission of claim 8, wherein said plurality of shift clutches alternate between adjacent said shift elements for a selective interconnection with one of said input shaft and said carrier sun shaft.

14. The transmission of claim 8, wherein said output shaft is generally coaxially aligned with said carrier sun shaft.

15. The transmission of claim 8, wherein said plurality of shift elements are arranged sequentially adjacent to each other along a length of said input shaft and said carrier sun shaft, wherein said low range clutch and said reverse range clutch are arranged generally in line with each other along said length of said input shaft and said carrier sun shaft, and said planetary gear set is arranged at adjacent ends of said carrier sun shaft and said output shaft.

16. A work machine, comprising:
 an engine; and
 a rear end coupled with said engine, said rear end including a transmission, said transmission having:
  an input shaft;
  a carrier sun shaft;
  an output shaft;
  a planetary gear set including a sun gear coupled with said carrier sun shaft, a ring gear coupled with said output shaft, and a plurality of planetary gears enmeshed between said sun gear and said ring gear;
  a plurality of shift elements, each said shift element including a first gear coupled with said input shaft, and a second gear coupled with said carrier sun shaft and enmeshed with said first gear;
  a plurality of shift clutches, each said single shift clutch selectively coupled between a corresponding said single shift element and one of said input shaft and said carrier sun shaft;
  a low range clutch selectively coupled between said input shaft and said plurality of planetary gears;
  a high range clutch selectively coupled between said carrier sun shaft and said output shaft; and
  a reverse range clutch selectively coupled between an immovable feature and said plurality of planetary gears.

17. The work machine of claim 16, including a carrier gear coupled between said plurality of planetary gears, and each of said low range clutch and said reverse range clutch.

18. The work machine of claim 16, wherein said high range clutch is configured to lock planetary action of said planetary gear set when engaged.

19. The work machine of claim 16, wherein said plurality of shift clutches alternate between adjacent said shift elements for a selective interconnection with one of said input shaft and said carrier sun shaft.

20. The work machine of claim 16, wherein said output shaft is generally coaxially aligned with said carrier sun shaft.

21. The work machine of claim 16, wherein said plurality of shift elements are arranged sequentially adjacent to each other along a length of said input shaft and said carrier sun shaft, wherein said low range clutch and said reverse range clutch are arranged generally in line with each other along said length of said input shaft and said carrier sun shaft, and said planetary gear set is arranged at adjacent ends of said carrier sun shaft and said output shaft.

22. The work machine of claim 16, wherein said transmission is configured to shift a single shift element for one of an up shift and a down shift.

* * * * *